(12) United States Patent
Kukolj

(10) Patent No.: US 12,158,909 B2
(45) Date of Patent: Dec. 3, 2024

(54) SYSTEM AND METHOD FOR MANAGING DOCUMENT METADATA

(71) Applicant: The Toronto-Dominion Bank, Toronto (CA)

(72) Inventor: Goran Kukolj, Etobicoke (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/332,796

(22) Filed: Jun. 12, 2023

(65) Prior Publication Data

US 2023/0325429 A1     Oct. 12, 2023

Related U.S. Application Data

(63) Continuation of application No. 17/302,871, filed on May 14, 2021, now Pat. No. 11,714,844.

(51) Int. Cl.
   *G06F 16/00*        (2019.01)
   *G06F 16/31*        (2019.01)
   *G06F 16/383*      (2019.01)

(52) U.S. Cl.
   CPC .......... *G06F 16/383* (2019.01); *G06F 16/322* (2019.01)

(58) Field of Classification Search
   CPC .............................. G06F 16/383; G06F 16/322
   See application file for complete search history.

(56) References Cited

U.S. PATENT DOCUMENTS

| | | | |
|---|---|---|---|
| 8,954,441 B1 | 2/2015 | Baranov et al. | |
| 9,576,071 B2 | 2/2017 | Metreveli et al. | |
| 10,339,183 B2 | 7/2019 | Kohlmeier | |
| 10,585,903 B2 | 3/2020 | Chin et al. | |
| 10,719,557 B2 | 7/2020 | Cohen et al. | |
| 2003/0074352 A1 | 4/2003 | Roboczi et al. | |
| 2003/0177112 A1* | 9/2003 | Gardner | G16B 50/10 |
| 2003/0233383 A1 | 12/2003 | Koskimies | |
| 2006/0106847 A1 | 5/2006 | Eckardt et al. | |
| 2008/0005152 A1 | 1/2008 | Kraft et al. | |
| 2010/0114879 A1* | 5/2010 | Zhong | G06F 40/295 |
| | | | 707/723 |
| 2013/0246049 A1* | 9/2013 | Mirhaji | G06F 40/253 |
| | | | 704/9 |
| 2015/0350324 A1 | 12/2015 | Hu et al. | |

(Continued)

*Primary Examiner* — Syed H Hasan
(74) *Attorney, Agent, or Firm* — CPST Intellectual Property Inc.; Brett J. Slaney

(57) ABSTRACT

A system, server device, and method are provided for managing document metadata. The method includes storing metadata in a graph separately from documents with which the metadata is associated and connecting metadata in the graph according to a hierarchy, with each node of the graph being classified based on metadata content. The method also includes assigning properties to edges in the graph connecting the nodes; receiving, via a communications module, an instruction to update the metadata; and dynamically updating at least one edge or node in the graph according to the instruction without requiring access to an associated document. The method also includes receiving, via the communications module, an inquiry related to a document; and responding to the inquiry, via the communications module, after accessing metadata associated with the document by navigating the graph.

20 Claims, 12 Drawing Sheets

(56) References Cited

U.S. PATENT DOCUMENTS

| | | |
|---|---|---|
| 2016/0261716 A1 | 9/2016 | Khalaf et al. |
| 2018/0196866 A1 | 7/2018 | Standefer et al. |
| 2019/0005049 A1* | 1/2019 | Mittal ................. G06F 16/3347 |
| 2019/0108274 A1 | 4/2019 | DaBoll-Lavoie et al. |
| 2020/0019589 A1 | 1/2020 | Dykema |
| 2020/0201827 A1* | 6/2020 | Chacko ................. G06F 9/4451 |

* cited by examiner

SYSTEM AND METHOD FOR MANAGING DOCUMENT METADATA

CROSS-REFERENCE TO RELATED APPLICATION(S)

This application is a Continuation of U.S. patent application Ser. No. 17/302,871 filed on May 14, 2021, the contents of which are incorporated herein by reference in their entirety.

TECHNICAL FIELD

The following relates generally to managing document metadata.

BACKGROUND

Document management can include processes of storing, retrieving, sharing, managing lifecycle, and other core capabilities. To move away from monolithic 'one-size fits all' document management platforms, and to support business need for a specific business enabled capabilities, generally two distinct document management capabilities are needed, namely transactional document storage and archival document storage.

Transactional document storage addresses business driven document collaboration capabilities, the need for the transactional document processing, lifecycle control and human approvals. Transactional document storage also addresses the need to manage the document state defined by a specific business process; and the need to be distributed and implemented by individual lines of business or to consume from an available shared service for document storage.

Archival document storage is governed and centralized, with benefits that can include cost reduction, enablement for high volumes, increased security, retention policy management, support for cognitive self-learning services, ensuring completeness, managing uniformity of the captured metadata, and providing simplified searching, data mining and document retrieval.

Many applications, particularly with online workflows, can have intensive storage requirements, e.g., mortgage applications. However, current data management platforms are typically rigid in their approach to document and metadata management. In particular, these platforms may employ data models which require iterative and often manual efforts to change the taxonomy of how documents and metadata are stored.

BRIEF DESCRIPTION OF THE DRAWINGS

Embodiments will now be described with reference to the appended drawings wherein.

DETAILED DESCRIPTION

Figure 1:
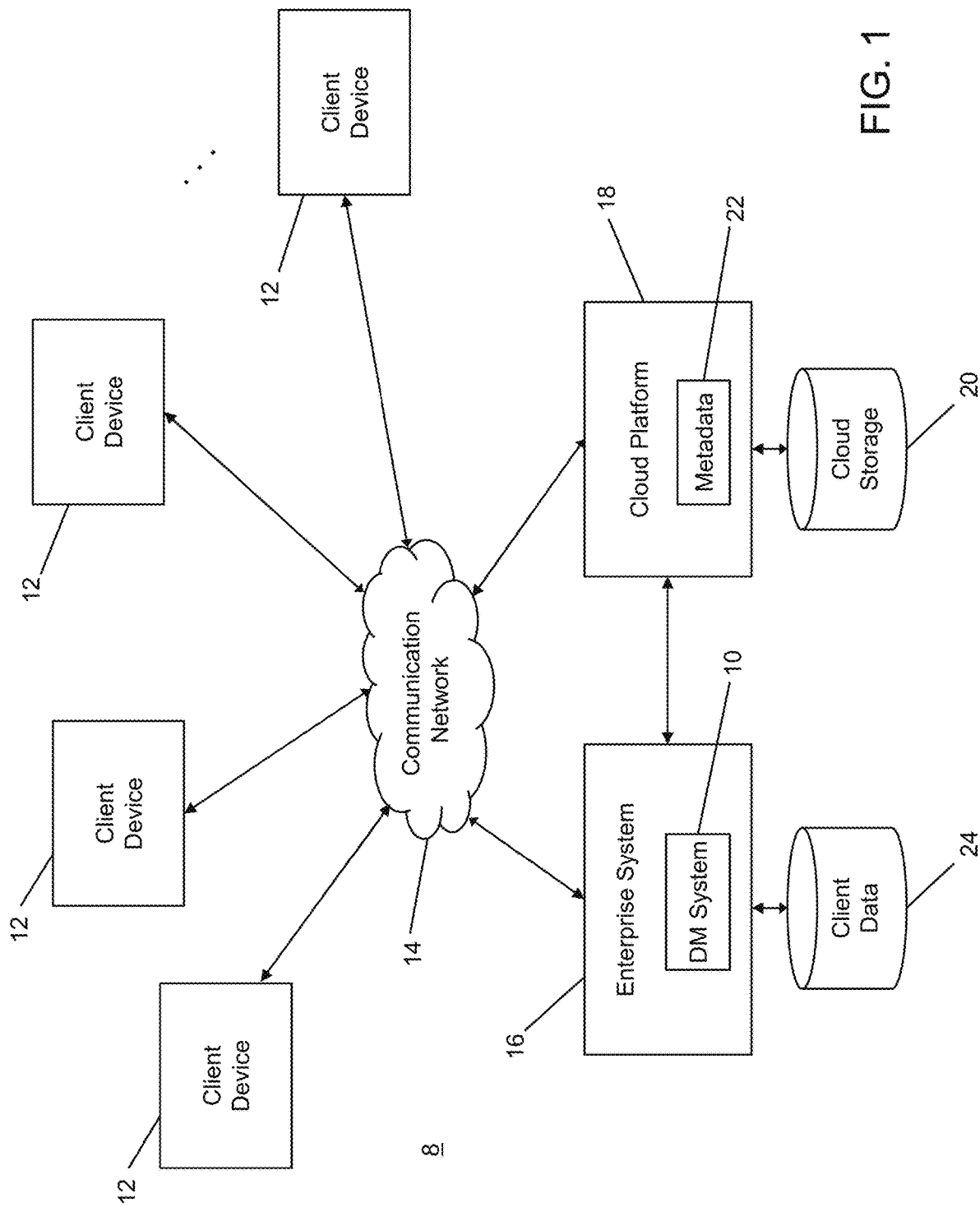
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

A document management system and metadata management system are provided, which can be implemented as a larger data management platform. The systems described herein can provide a dynamic taxonomy, improved metadata management, and an enhanced search engine. The data management platform can enable cognitive searches with language recognition, optical character recognition (OCR) searches, full context searches, high performance searches; and without service degradation (e.g., between concurrent updates and search requests).

The data management platform can also provide flexibility, capability-based consumption models, simplified migration from legacy platforms, a distinction between transactional and archival document storage, developer-enabled consumption models, and auto lifecycle management, with enhanced batch processing and an ability to eliminate physical size limits.

By leveraging the computational power of cloud platforms, the data management platform can be built to be highly scalable and have a reliable architecture by employing serverless computing strategies. A serverless architecture enables organizations and professionals to achieve rapid innovation through an application development model. Serverless computing can be enabled by cloud providers where application developers are fully isolated from the platform and hardware management.

In an example implementation described below, Microsoft® Azure Block Blob, Azure Search and Azure Cosmos DB components can be used as fully self-managed services, with no need for manual complex multi datacenter deployments, operational support, licensing or peak workload provision. It can be appreciated that other cloud-based platforms can also be used with or for the presently described document management, metadata management and wider data management platforms.

The data management platform can provide an application layer to enable line of business applications to interact with documents through an application programming interface (API) to the backend systems. Document management user interfaces (UIs) can provide a front-end interface for required document management functionalities. A document management command line interface can also provide native access to document management functional capabilities.

The proposed platforms can also provide an API/abstraction layer to leverage the capabilities of the Blob and cloud database components, as described below. This layer exposes the core document management capabilities in a solution agnostic way while hiding the underlying complexity. Cloud resource services can be called through a resource interface layer, e.g., through REST or with native interfaces provided by software development kits (SDKs). Such a resource interface layer may provide access to a storage or resource layer to perform native operations on storage and other resources.

The cloud database container can be configured to implement a dynamic taxonomy for metadata by integrating or interacting with the metadata management system. The taxonomy enables document classification according to prescribed criteria (e.g., business, organization, governance, etc.) to support hieratical dynamic structures. The metadata management system can also enrich the taxonomy through cognitive capabilities. The cloud database container can also support cognitive enablement, including dynamic relationship constructs based on content meaning and frequency of usage (e.g., learning) and support for document identification, association and related categories utilizing a knowledge graph.

That is, dynamic document classification can be provided through cognitive technology to simplify taxonomy usage categorization and classification of metadata. In this way, metadata can be accessed, updated, scaled, and measured independently of the documents to which it relates, without requiring the documents to be retrieved, modified and re-saved, thus saving computational power and increasing speed.

It will be appreciated that while certain examples provided herein are directed to financial- or banking-related applications and document and metadata management for such entities, the principles discussed herein equally apply to other enterprises, applications, platforms, services, or computing entities that store data and management metadata for such documents.

Certain example systems and methods described herein enable document metadata management. In one aspect, there is provided a server device for managing document metadata. The device includes a processor, a communications module coupled to the processor, and a memory coupled to the processor. The memory stores computer executable instructions that when executed by the processor cause the processor to store metadata in a graph separately from documents with which the metadata is associated and connect metadata in the graph according to a hierarchy, with each node of the graph being classified based on metadata content. The memory also stores computer executable instructions that when executed by the processor cause the processor to assign properties to edges in the graph connecting the nodes; receive, via the communications module, an instruction to update the metadata; and dynamically update at least one edge or node in the graph according to the instruction without requiring access to an associated document. The memory also stores computer executable instructions that when executed by the processor cause the processor to receive, via the communications module, an inquiry related to a document; and respond to the inquiry, via the communications module, after accessing metadata associated with the document by navigating the graph.

In another aspect, there is provided a method of managing document metadata. The method is executed by a server device having a communications module. The method includes storing metadata in a graph separately from documents with which the metadata is associated; and connecting metadata in the graph according to a hierarchy, with each node of the graph being classified based on metadata content. The method also includes assigning properties to edges in the graph connecting the nodes; receiving, via the communications module, an instruction to update the metadata; and dynamically updating at least one edge or node in the graph according to the instruction without requiring access to an associated document. The method also includes receiving, via the communications module, an inquiry related to a document; and responding to the inquiry, via the communications module, after accessing metadata associated with the document by navigating the graph.

In another aspect, there is provided a non-transitory computer readable medium for managing document metadata. The computer readable medium includes computer executable instructions for storing metadata in a graph separately from documents with which the metadata is associated; and connecting metadata in the graph according to a hierarchy, with each node of the graph being classified based on metadata content. The computer readable medium also includes computer executable instructions for assigning properties to edges in the graph connecting the nodes; receiving, via a communications module, an instruction to update the metadata; and dynamically updating at least one edge or node in the graph according to the instruction without requiring access to an associated document. The computer readable medium also includes computer executable instructions for receiving, via the communications module, an inquiry related to a document; and responding to the inquiry, via the communications module, after accessing metadata associated with the document by navigating the graph.

In certain example embodiments, responding to the inquiry can include accessing a model of the graph to permit a cognitive search against the model and the contents of the graph. The model can be an unstructured data model.

In certain example embodiments, the server device can provide an enterprise application programming interface layer between one or more applications and data storage elements for storing the documents and metadata. The server device can also access both transactional and archive storage containers to accommodate both new containers and legacy storage elements. The enterprise application programming interface layer can interface with a cloud-based computing service layer to manage access to the transactional and archive storage containers. The graph can be associated with the transactional storage containers.

In certain example embodiments, the enterprise application programming interface layer can include an interface for migrating legacy applications.

In certain example embodiments, the enterprise application programming interface layer can provide an abstraction layer for the applications to expose document management capabilities provided by the graph and document storage architecture beneath the abstraction layer.

In certain example embodiments, the service device can determine ratings for the edges of the graph based on an importance or frequency of use of the edge in assigning metadata to the documents. The ratings for the edges can be determined in response to the inquiry, the inquiry being related to a plurality of documents.

In certain example embodiments, the server device can receive a request to add a new metadata feature and add one or more edges to the graph to represent the new metadata feature.

FIG. 1 illustrates an exemplary computing environment 8 which integrates a document management (DM) system 10 with an enterprise system 16 such as a financial institution system, e.g., to enable financial-related applications to store and manage documents stored in a cloud storage 20 and metadata 22 dynamically stored and updated as described below, in a cloud platform 18. In one aspect, the computing environment 8 may include the DM system 10, one or more client devices 12, and a communications network 14 connecting one or more components of the computing environment 8.

The computing environment 8 may also include the enterprise system 16 (e.g., a financial institution such as a commercial bank) that provides products and/or services to users. For example, a financial institution system can process financial transactions associated with financial service accounts. While several details of the enterprise system 16 have been omitted for clarity of illustration, reference will be made to FIG. 8 below for additional details.

The enterprise system 16 includes or otherwise has access to a datastore for storing client data 24. The client data 24 may include both data associated with a user of a client device 12 that interacts with the DM system 10 or enterprise system 16 (e.g., for participating in mobile banking) and transaction history data that is captured and provided with a transaction entry, e.g., in the graphical user interface of a mobile or web-based application such as a banking application. The data associated with a user can include client profile data that may be mapped to corresponding financial data for that user and/or may include some of the financial data. Such client profile data can include both data that is associated with a client as well as data that is associated with one or more user accounts for that client as recognized by the computing environment 8.

The client data 24 associated with a client may also include, without limitation, demographic data (e.g., age, gender, income, location, etc.), preference data input by the client, and inferred data generated through machine learning, modeling, pattern matching, or other automated techniques. The client profile data may also include historical interactions and transactions associated with the enterprise system 16, e.g., login history, search history, communication logs, documents, etc.

It can be appreciated that while the cloud platform 18 and enterprise system 16 are shown as separate entities in FIG. 1, they may also be part of the same system. For example, the cloud platform 18 can be hosted and provided within the enterprise system 16, i.e., in a "private" cloud. It can also be appreciated that while the DM system 10 is shown as being integrated with the enterprise system 16, the DM system 10 can also be a standalone service, can be integrated with the cloud platform 18 or be provided by another entity, e.g., as part of a third party service outside of both the enterprise system 16 and cloud platform 18.

Client devices 12 may be associated with one or more users. Users may be referred to herein as customers, clients, correspondents, employees or other entities that interact with the enterprise system 16 and/or could platform 18 (directly or indirectly). The computing environment 8 may include multiple client devices 12, each client device 12 being associated with a separate user or associated with one or more users. In certain embodiments, a user may operate client device 12 such that client device 12 performs one or more processes consistent with the disclosed embodiments. For example, the user may use client device 12 to engage and interface with a mobile or web-based banking application which uses or incorporates the DM system 10, the cloud platform 18 or both to store and management documents used in an application, process workflow or other operation. In certain aspects, client device 12 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 14.

Communication network 14 may include a telephone network, cellular, and/or data communication network to connect different types of client devices 12. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

In one embodiment, the cloud platform 18 may be one or more computer systems configured to process and store information and execute software instructions to perform one or more processes consistent with the disclosed embodiments. In certain embodiments, although not required, the cloud platform 18 may be associated with one or more business entities or be provided by a separate service to such business entities, i.e., for the enterprise system 16. For example, the enterprise system 16 and cloud platform 18 may be part of a data management system associated with a commercial bank (e.g., financial institution system), a retailer, or some other type of business or enterprise.

Continuing with FIG. 1, enterprise system 16, cloud platform 18, and/or computing environment 8 more widely, may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the enterprise system 16 and cloud platform 18. The cryptographic server may be used to protect the client data 24, metadata 22, and/or data stored in the cloud storage 20, by way of encryption for data protection, digital signatures or message digests for data integrity, and by using digital certificates to authenticate the identity of the users and client devices 12 with which the enterprise system 16 and/or cloud platform 18 communicates to inhibit data breaches by adversaries. It can be appreciated that various cryptographic mechanisms and protocols can be chosen and implemented to suit the constraints and requirements of the particular deployment of the enterprise system 16 or cloud platform 18 as is known in the art.

Figure 2:
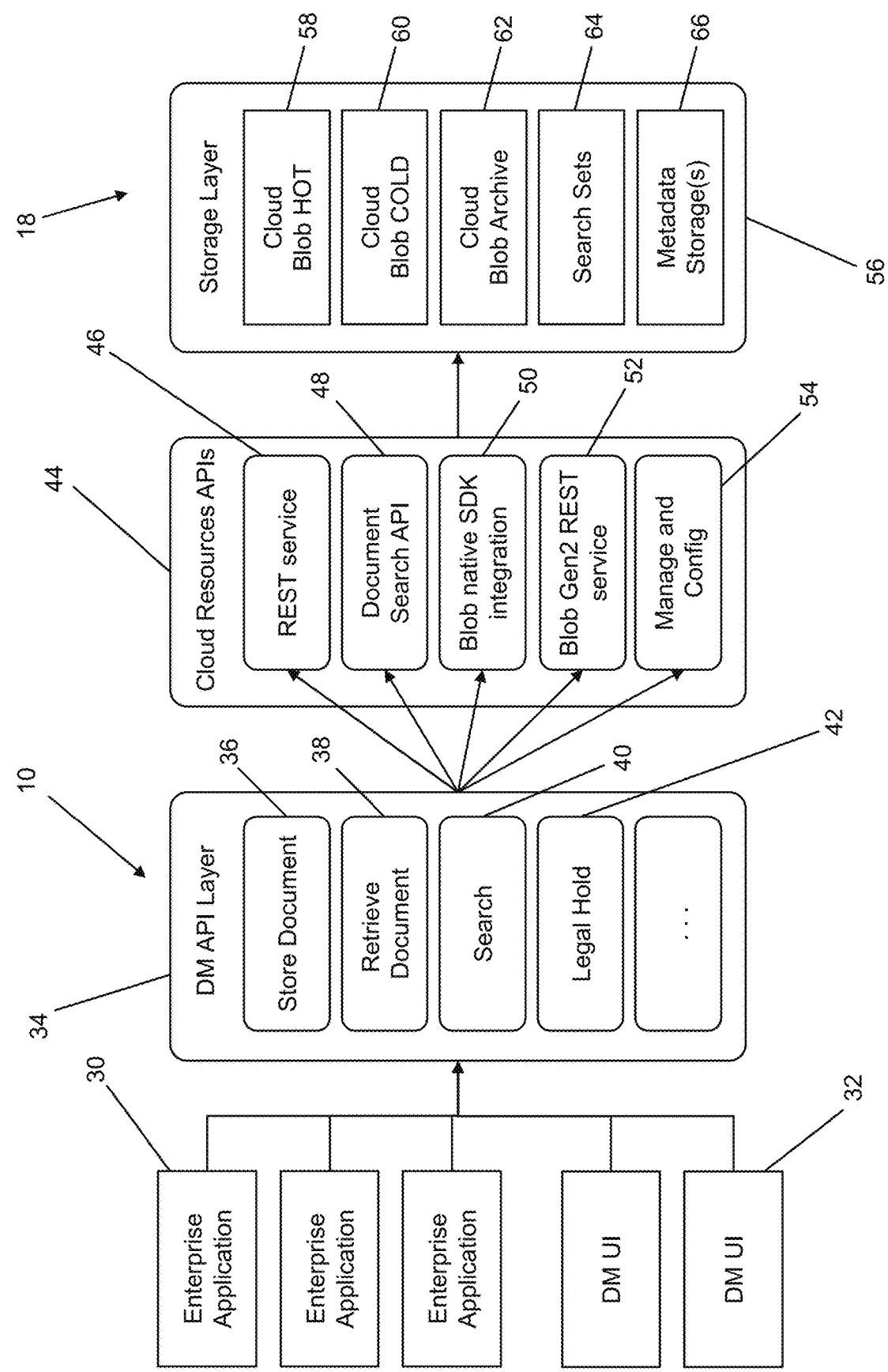
FIG. 2 is a schematic diagram of conceptual view of a document management system that can be implemented in the computing environment of FIG. 1.

FIG. 2 illustrates a conceptual view of a data and document management platform that can be implemented by an enterprise system 16 in conjunction with a cloud platform 18. In this example an application layer includes various enterprise applications 30 that interact with documents through a DM API layer 34. The DM UI 32 provides a front-end interface for document management functionalities. It can be appreciated that a DM command line can provide native access to document management functional capabilities. The DM API layer 34 in this example is provided by or within the DM system 10 and can also include or interface with cloud resources APIs 44 in a resource interface layer. The DM API layer 34 exposes core document management capabilities in a solution agnostic way. The DM API layer 34 can be provided to hide underlying complexities and how the resources used in the back-end are connected and interoperate. In this example, the DM API layer 34 provides a number of business capabilities, such as store document 36, retrieve document 38, search 40, and legal hold 42. As illustrated in FIG. 2, these business capabilities are provided as examples and without limitation. The cloud resources APIs 44 can be used to call native cloud resource services, e.g., through REST or with native interfaces such as SDKs. In this example, the cloud resources APIs 44 being illustrated include, without limitation, a REST service 46, a document search API 48, a blob native SDK integration 50, a blob second generation (Gen2) REST service 52, and a manage and config 54 application service.

The resource interface layer provides access to a storage layer 56 provided by or on the cloud platform 18. The storage layer 56 can also be considered a resource layer that performs native operations on storage and other resources such as metadata 22. In this example, the storage layer 56 includes the following application components: HOT cloud blob (frequent or transactional) 58, COLD cloud blob (less frequent) 60, cloud blob archive (archival storage) 62, search sets 64, and metadata storage 66 (for persisting metadata 22 such as that shown in FIG. 1).

Figure 3:
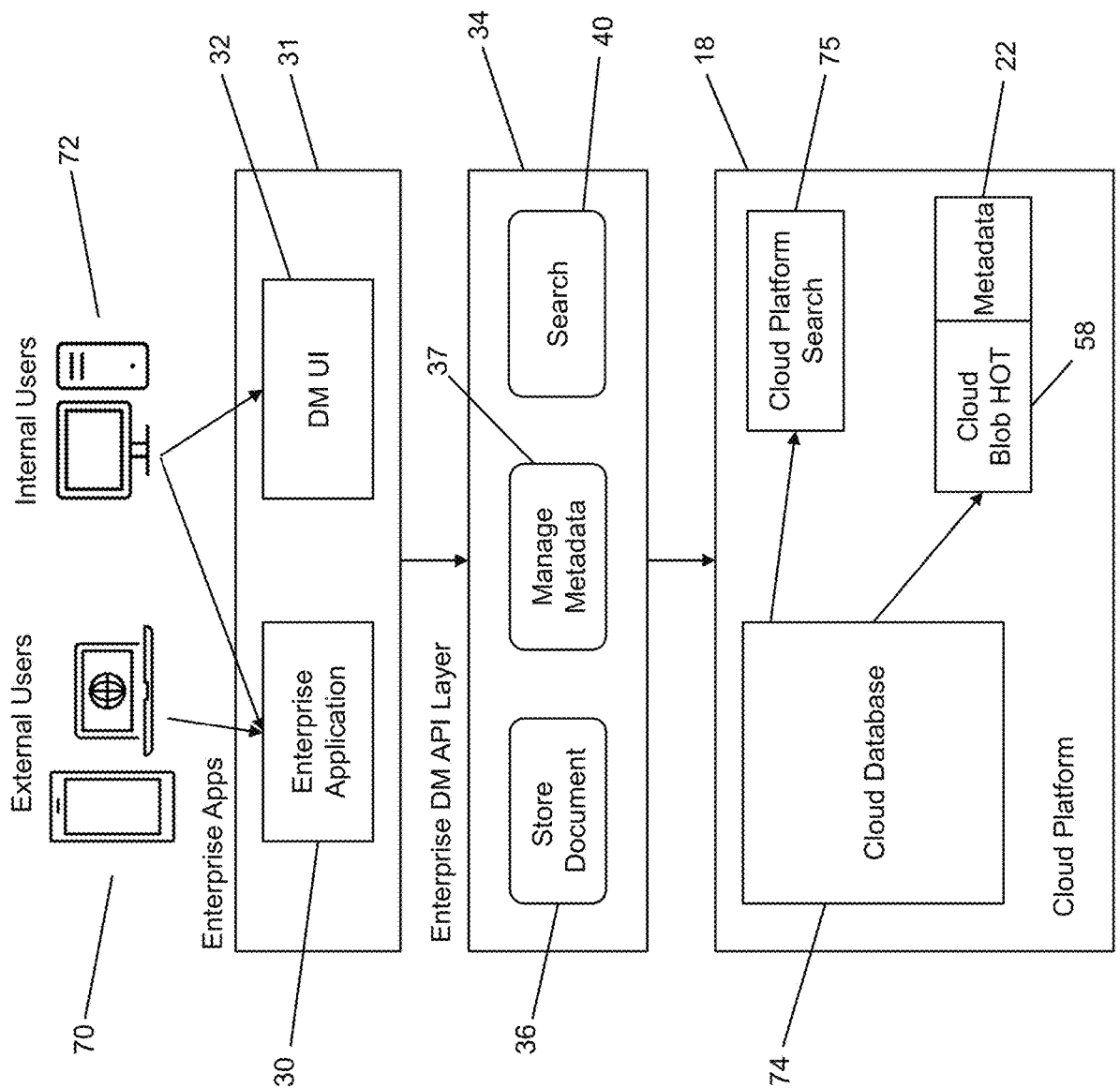
FIG. 3 is a block diagram of an example configuration for integrating a document management system with a cloud platform.

FIG. 3 illustrates an example configuration for integrating a DM system 10 with a cloud platform 18 using a Microsoft® Azure Cosmos database structure. Such a database structure can be used to provide high availability, high throughput, low latency, and tunable consistency. The structure shown in FIG. 3 can be configured to be globally distributed and available in any of the cloud's "regions". The database structure replicates data to such regions associated with user storage accounts. The database structure shown in FIG. 3 can provide access control at a granular level, provide enhanced metadata management, provide native searching capabilities, with high concurrency. In this example, external users 70 are shown which can interface and interact with enterprise applications 30 at an enterprise apps layer 31. Internal users 72 are also shown, which can interface and interact with the enterprise applications 30 and the DM UI 32 at the enterprise apps layer 31 to perform document management functions. The enterprise DM API layer 34 is also shown, which in this example includes the store document 36 and search 40 business capabilities, as well as a manage metadata 37 capability. The DM API layer 34 connects to the cloud platform 18 that includes a cloud database 74 such as Cosmos DB as discussed above. The cloud database 74 can leverage a cloud platform search 75 capability of the cloud platform 18 and illustrates an example of a HOT cloud blob 58 with associated metadata 22. It can be appreciated that, as discussed further below, the documents to be stored and managed by the DM system 10 are stored in blob storage separately from the cloud database 74. Moreover, the metadata 22 that is shown in association with a cloud blob 58 may in part be stored in the blob storage but as detailed below, most of which is stored and accessed in a metadata graph.

Figure 4:
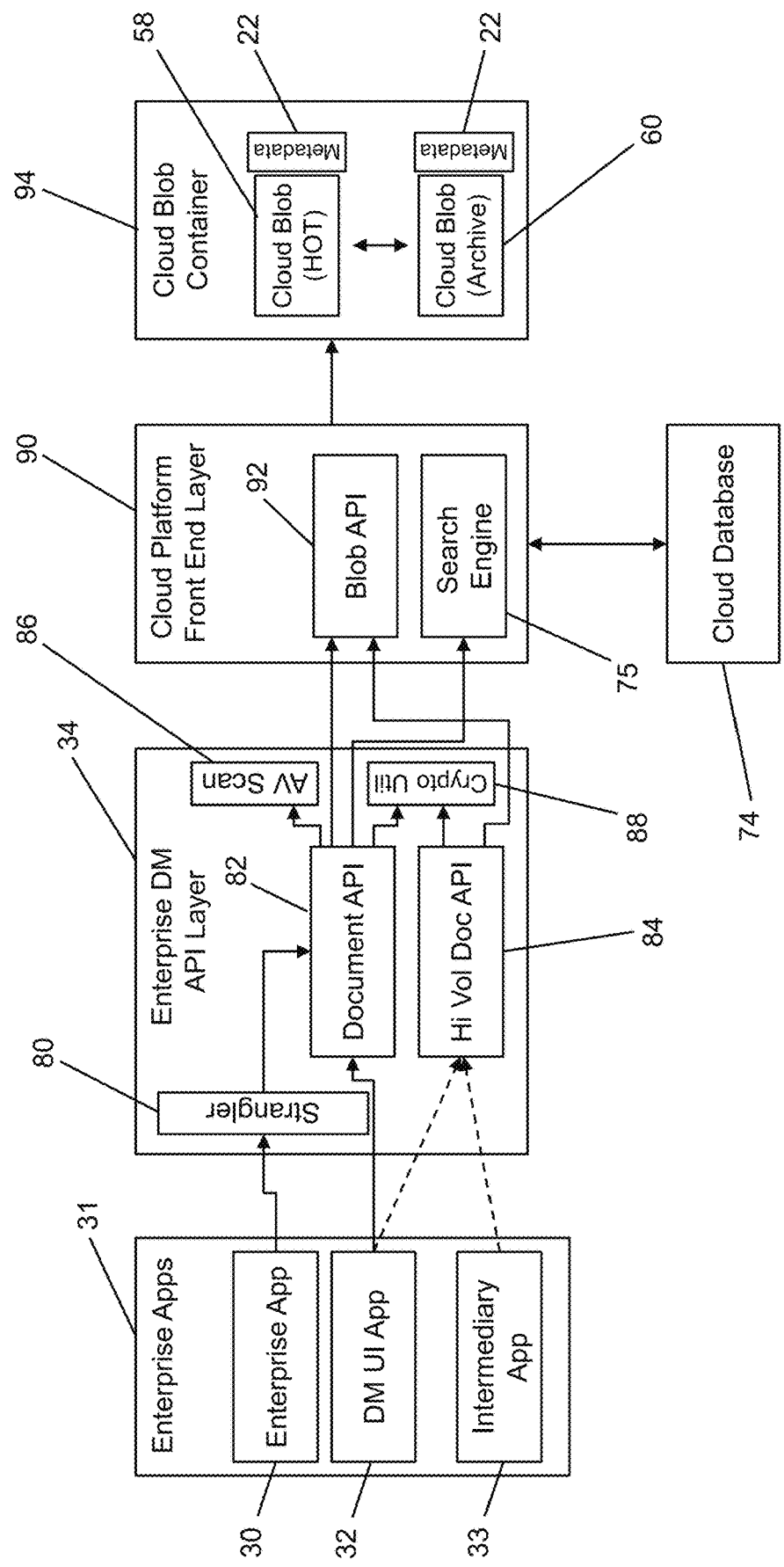
FIG. 4 is a logical architectural view of the document management system.

FIG. 4 illustrates an example of an architectural view for interfacing with the cloud platform 18 via the DM API layer 34. In this example, a strangler component 80 can be provided to migrate legacy systems incrementally by replacing existing functionalities with new applications and services in a phased approach. The strangler component 80 enables migration from legacy APIs without impacting existing consumers of those services. A document API 82 provides technological independence from underlying implementations, to enable future "lift and shift" operations without impacting service consumers. The documents across various LOBs can be accessed through the document API 82 in the DM API layer 34. As also shown in FIG. 4, a separate Hi Vol Doc API 84 can be provided for high volume transactional operations. The document API 82 can use an AV scan component 86 and a crypto utility 88 that provides additional cryptographic protection such as encryption when required. The enterprise DM API layer 34 is consumed from a cloud platform (e.g., Azure) front end layer 90 with the cloud database 74 (e.g., Cosmos DB) being used to provide object-level permissions. The cloud platform front-end layer 90 includes a blob API 92 and the cloud search engine 75. The blob API 92 can be used to communicate with back-end storage, namely a cloud blob container 94 in this example, by calling functions on blob container objects 58, 60 having associated metadata 22. In the blob container 94, lifecycle policies can be used to maintain HOT and ARCHIVE data on the blobs 58, 60.

Figure 5:
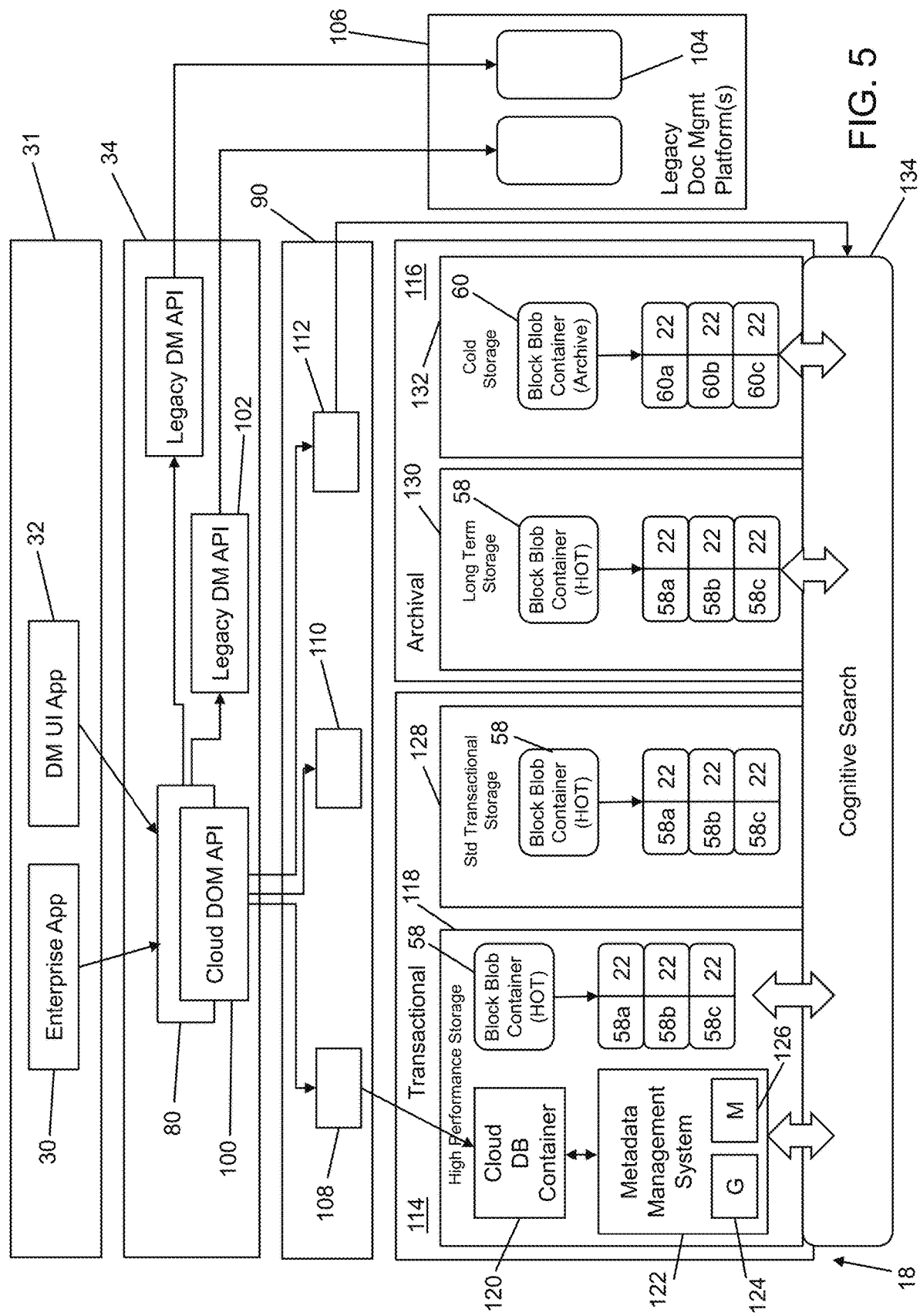
FIG. 5 is a technology stack for a cloud-based document storage solution having a metadata management system for dynamic metadata management.

FIG. 5 illustrates an example of a technology stack that can be used to implement a cloud-based document storage solution having metadata management. In FIG. 5 it can be seen that the strangler component 80 enables legacy DM APIs 102 to continue to be used with respective DM systems 104 in a legacy DM platform 106. The strangler component 80 also provides an interface between the enterprise apps layer 31 and the cloud platform front-end layer 90 using a cloud data object model (DOM) API 100. The cloud DOM API 100 interfaces with the front-end layer 90 via a cloud database API 108, a storage blob API 110, and a cognitive search API 112.

The cloud database API 108 provides access to a cloud database container 120 in a transactional portion 114 of the cloud database 18. The cloud database container 120 utilizes a metadata management system 122 that includes a metadata graph (G) 124 and a data model (M) 126, which can be an unstructured data model in this example. The metadata graph 124 can be used to store and dynamically update metadata that is associated with documents in the block blob containers, in this example HOT blob storage 58 in a high performance storage 118 and in a standard transactional storage 128. In this example, the HOT blob storage blocks include n number of blobs 58a, 58b, 58c, etc., with associated metadata 22. As noted above, while some metadata 22 is stored with the documents on the blobs 58a-58c, much of the metadata 22 can be stored and updated via the metadata graph 124 according to the data model 126. An archival portion 116 includes both long term storage 130 and cold storage 132. The blob API 110 can be used to access block blob containers, including a HOT block blob container 58 in the long term storage 130 and an ARCHIVE block blob container 60 in the cold storage 132.

The cognitive search API 112 provides access to a cognitive search layer 134, which can access the blob storage and the metadata management system 122 to perform cognitive search operations.

Figure 6:
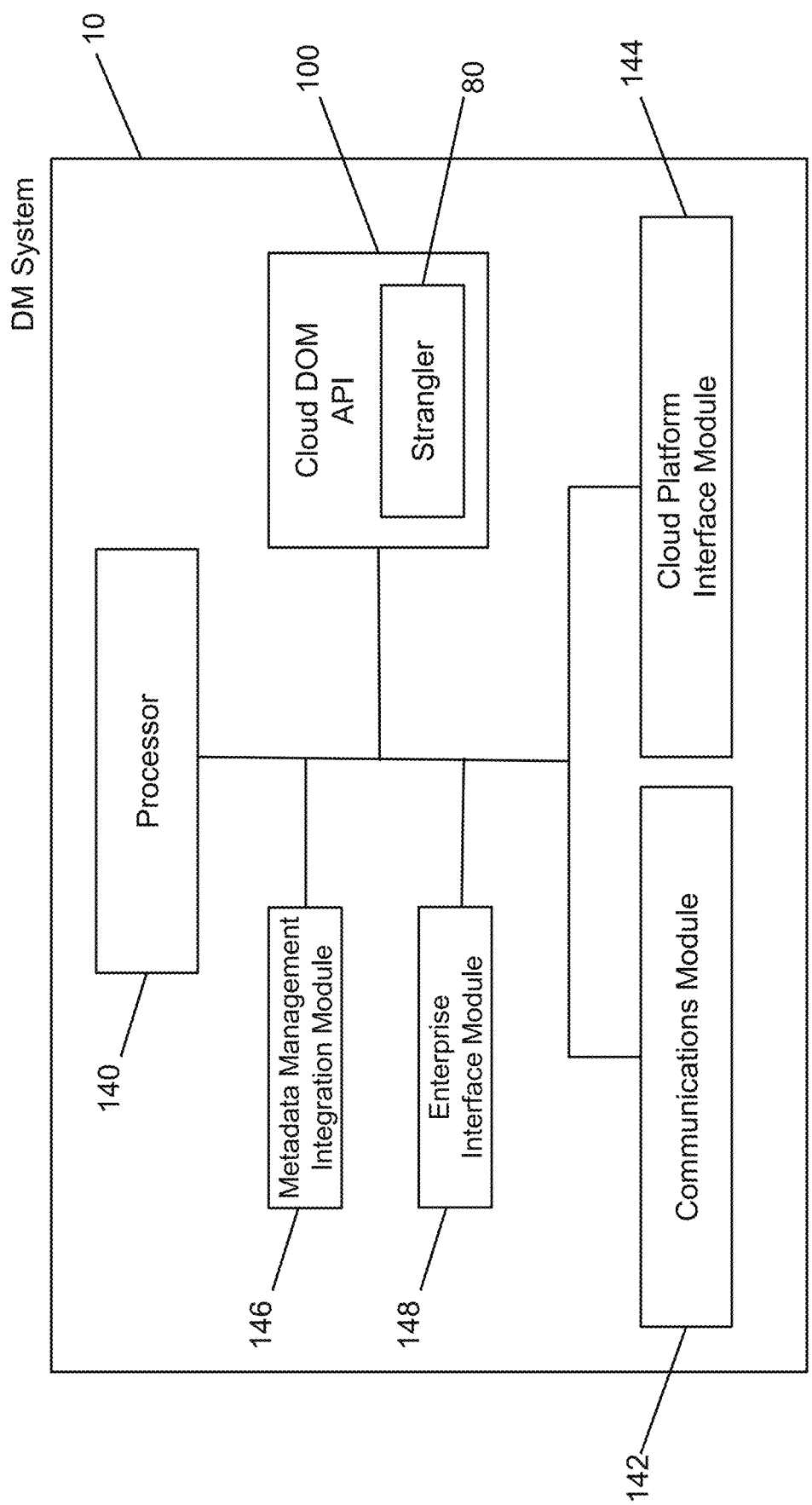
FIG. 6 is a block diagram of an example configuration of a document management system.

In FIG. 6, an example configuration of the DM system 10 is shown. In certain embodiments, the DM system 10 may include one or more processors 140, a communications module 142, and a cloud platform interface module 144 for interfacing with the cloud platform 18 and cloud storage 20 to retrieve, modify, and store (e.g., add) data, Communications module 142 enables the DM system 10 to communicate with one or more other components of the computing environment 8 such as client device 12 (or one of its components), via a bus or other communication network, such as the communication network 14. While not delineated in FIG. 6, the DM system 10 includes at least one memory or memory device that can include a tangible and non-transitory computer-readable medium having stored therein computer programs, sets of instructions, code, or data to be executed by processor 140. FIG. 6 illustrates examples of modules, tools and engines stored in memory by the DM system 10 and operated by the processor 140. It can be appreciated that any of the modules, tools, and engines shown in FIG. 6 may also be hosted externally and be available to the DM system 10, e.g., via the communications module 142. In the example embodiment shown in FIG. 6, the DM system 10 includes a metadata management integration module 146, an enterprise interface module 148, and the cloud DOM API 100 with strangler component 80.

The DM system 10 can be configured to apply a hierarchy of permission levels or otherwise apply predetermined criteria to determine what client data 24, documents, metadata, or application data can be shared with which entity in the computing environment 8. As such, access control functionality can be used by the DM system 10 to control the sharing of certain client profile data or other client data 24 based on a type of client/user/application, a permission or preference, or any other restriction imposed by the computing environment 8 or enterprise application 32 with which the DM system 10 is used.

The DM system 10 may also include the enterprise interface module 148 to provide a graphical user interface (GUI) or API connectivity to communicate with the enterprise system 16. It can be appreciated that the enterprise interface module 148 may also provide a web browser-based interface, an application or "app" interface, a machine language interface, etc.

Figure 7:
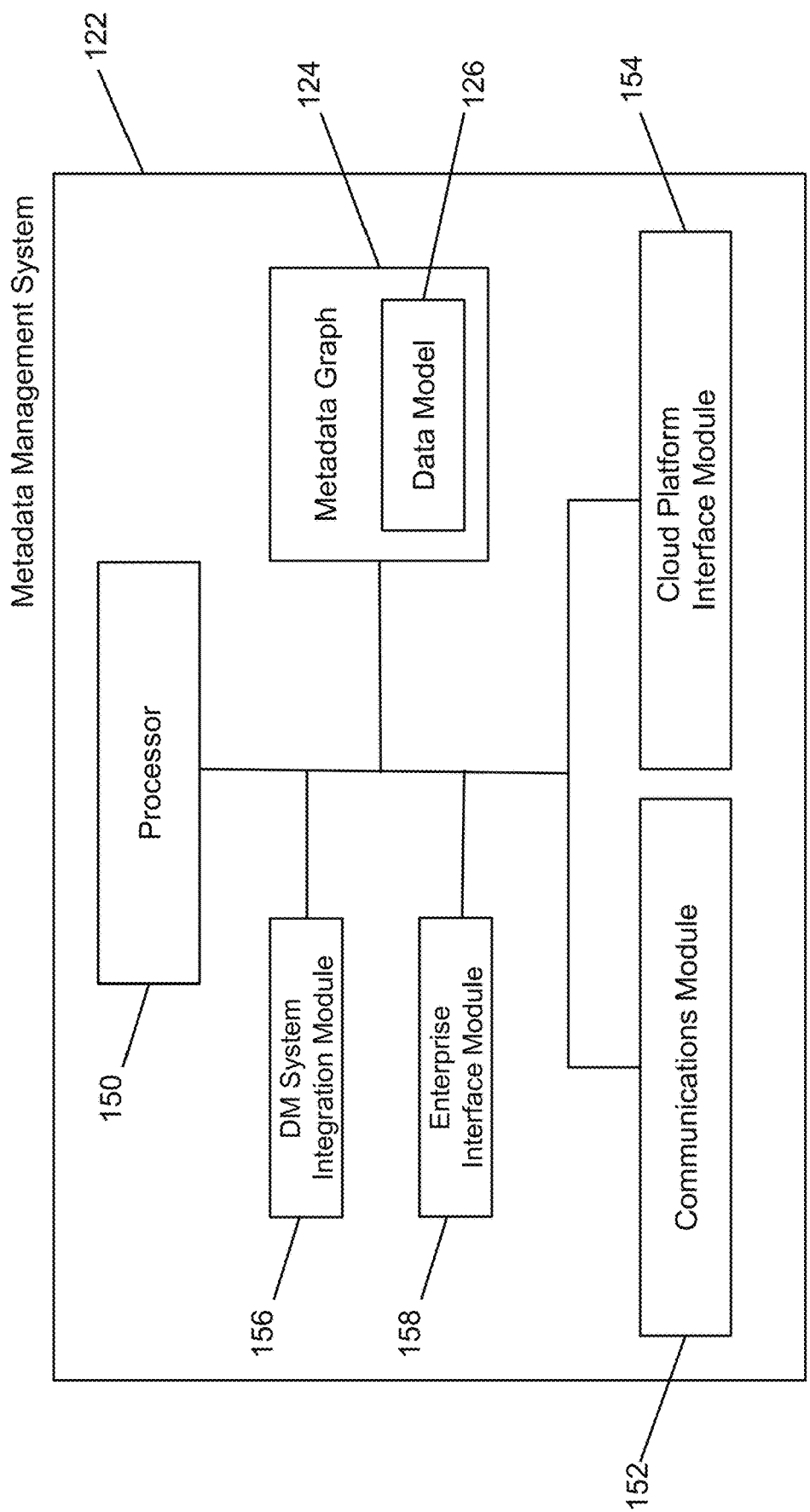
FIG. 7 is a block diagram of an example configuration of a metadata management system.

In FIG. 7, an example configuration of the metadata management system 122 is shown. In certain embodiments, the metadata management system 122 may include one or more processors 150, a communications module 152, and a cloud platform interface module 154 for interfacing with the cloud platform 18 and cloud storage 20 to retrieve, modify, and store (e.g., add) data. Communications module 152 enables the metadata management system 122 to communicate with one or more other components of the computing environment 8 such as client device 12 (or one of its components), via a bus or other communication network, such as the communication network 14. While not delineated in FIG. 7, the metadata management system 122 includes at least one memory or memory device that can include a tangible and non-transitory computer-readable medium having stored therein computer programs, sets of instructions, code, or data to be executed by processor 150. FIG. 7 illustrates examples of modules, tools and engines stored in memory by the metadata management system 122 and operated by the processor 150. It can be appreciated that any of the modules, tools, and engines shown in FIG. 7 may also be hosted externally and be available to the metadata management system 122, e.g., via the communications module 152. In the example embodiment shown in FIG. 7, the metadata management system 122 includes a DM system integration module 156, an enterprise interface module 158, and the metadata graph 124 and data model 126.

The metadata management system 122 can be configured to apply a hierarchy of permission levels or otherwise apply predetermined criteria to determine what client data 24, documents, metadata, or application data can be shared with which entity in the computing environment 8. As such, access control functionality can be used by the metadata management system 122 to control the sharing of certain client profile data or other client data 24 based on a type of client/user/application, a permission or preference, or any other restriction imposed by the computing environment 8 or enterprise application 32 with which the metadata management system 122 is used.

The metadata management system 122 may also include the enterprise interface module 158 to provide a graphical user interface (GUI) or API connectivity to communicate with the enterprise system 16. It can be appreciated that the enterprise interface module 158 may also provide a web browser-based interface, an application or "app" interface, a machine language interface, etc.

The metadata graph 124 enables the metadata management system 122 to dynamically access, read, store, edit, and delete metadata 22 by navigating through and interacting with the metadata graph 124 as discussed in greater detail below. The metadata graph 124 can be structured, updated, and used according to the data model 126, which can vary over time and/or vary based on the types of applications or type of enterprise for which the documents are used. The nodes and edges of the metadata graph 124 can also provide measurable characteristics of the associated documents, such as frequency of access, popularity, degree of change, etc.

Figure 8:
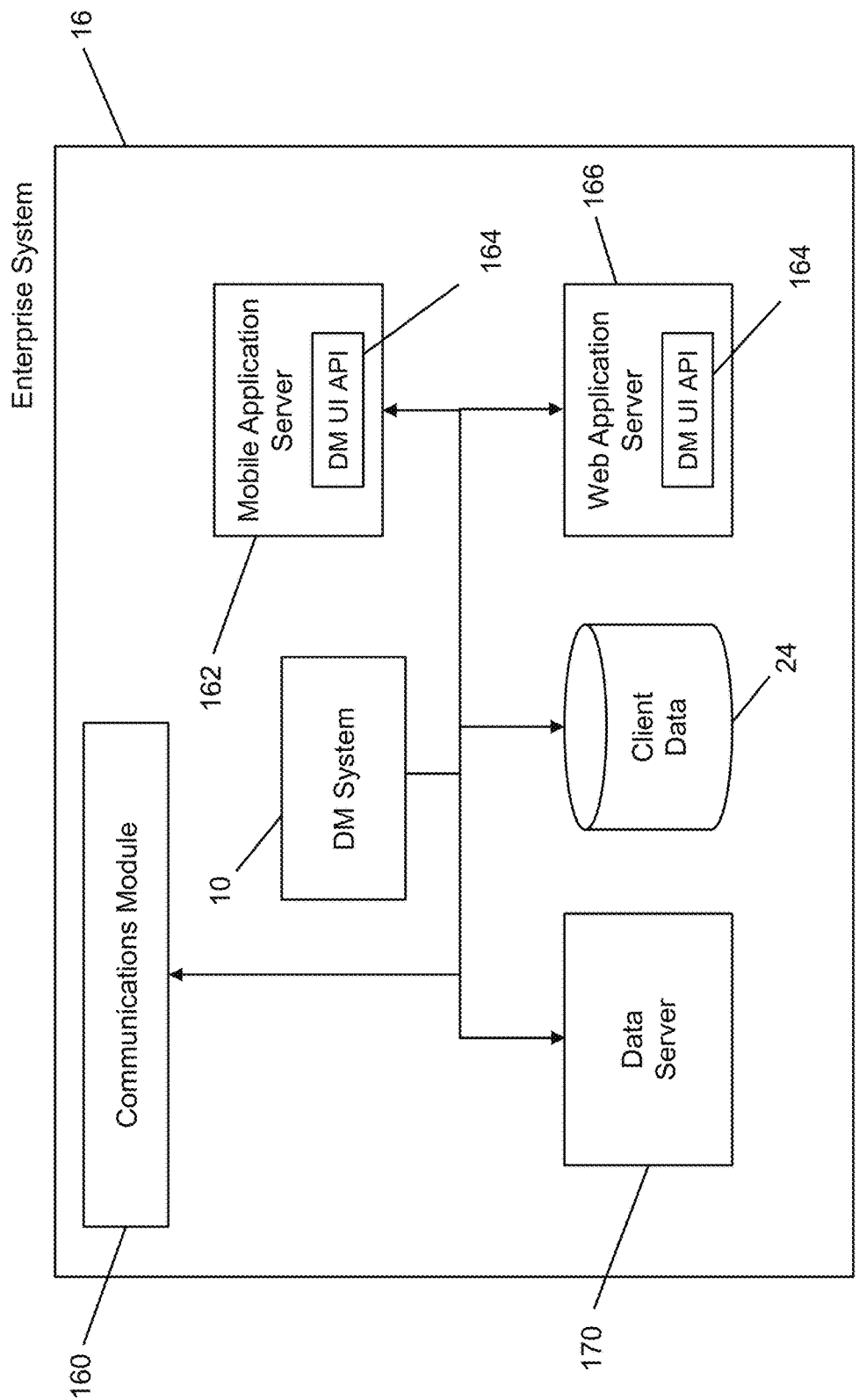
FIG. 8 is a block diagram of an example configuration of a financial institution system.

In FIG. 8, an example configuration of the enterprise system 16 is shown. The enterprise system 16 includes a communications module 160 that enables the enterprise system 16 to communicate with one or more other components of the computing environment 8, such as client device 12 (or one of its components), DM system 10, metadata management system 122, or cloud platform 18, via a bus or other communication network, such as the communication network 14. While not delineated in FIG. 8, the enterprise system 16 includes at least one memory or memory device that can include a tangible and non-transitory computer-readable medium having stored therein computer programs, sets of instructions, code, or data to be executed by one or more processors (not shown for clarity of illustration). FIG. 8 illustrates examples of servers and datastores/databases operable within the enterprise system 16. It can be appreciated that any of the components shown in FIG. 8 may also be hosted externally and be available to the enterprise system 16, e.g., via the communications module 160. In the example embodiment shown in FIG. 8, the enterprise system 16 includes one or more servers to provide access to the client data 24 to the DM system 10 or cloud platform 18 to perform document storage and metadata management functions. Exemplary servers include a mobile application server 162, a web application server 166 and a data server 170. Although not shown in FIG. 8, as noted above, the enterprise system 16 may also include a cryptographic server for performing cryptographic operations and providing cryptographic services. The cryptographic server can also be configured to communicate and operate with a cryptographic infrastructure. The enterprise system 16 may also include one or more data storages for storing and providing data for use in such services, such as data storage for storing client data 24.

Mobile application server 162 supports interactions with a mobile application installed on client device 12. Mobile application server 162 can access other resources of the enterprise system 16 to carry out requests made by, and to provide content and data to, a mobile application on client device 12. In certain example embodiments, mobile application server 162 supports a mobile banking application to provide payments from one or more accounts of a user, among other things. As shown in FIG. 8, the mobile application server 162 can include a DM UI API 164 which enables the mobile application to integrate or otherwise coordinate or work with the DM system 10 as described herein.

Web application server 166 supports interactions using a website accessed by a web browser application 192 (see FIG. 9) running on the client device 12. It can be appreciated that the mobile application server 162 and the web application server 166 can provide different front ends for the same application, that is, the mobile (app) and web (browser) versions of the same application. For example, the enterprise system 16 may provide a banking application that be accessed via a smartphone or tablet app while also being accessible via a browser on any browser-enabled device. As shown in FIG. 8, the web application server 166 may also include a DM UI API 164 to enable the web application to integrate or otherwise coordinate or work with the DM system 10.

Figure 9:
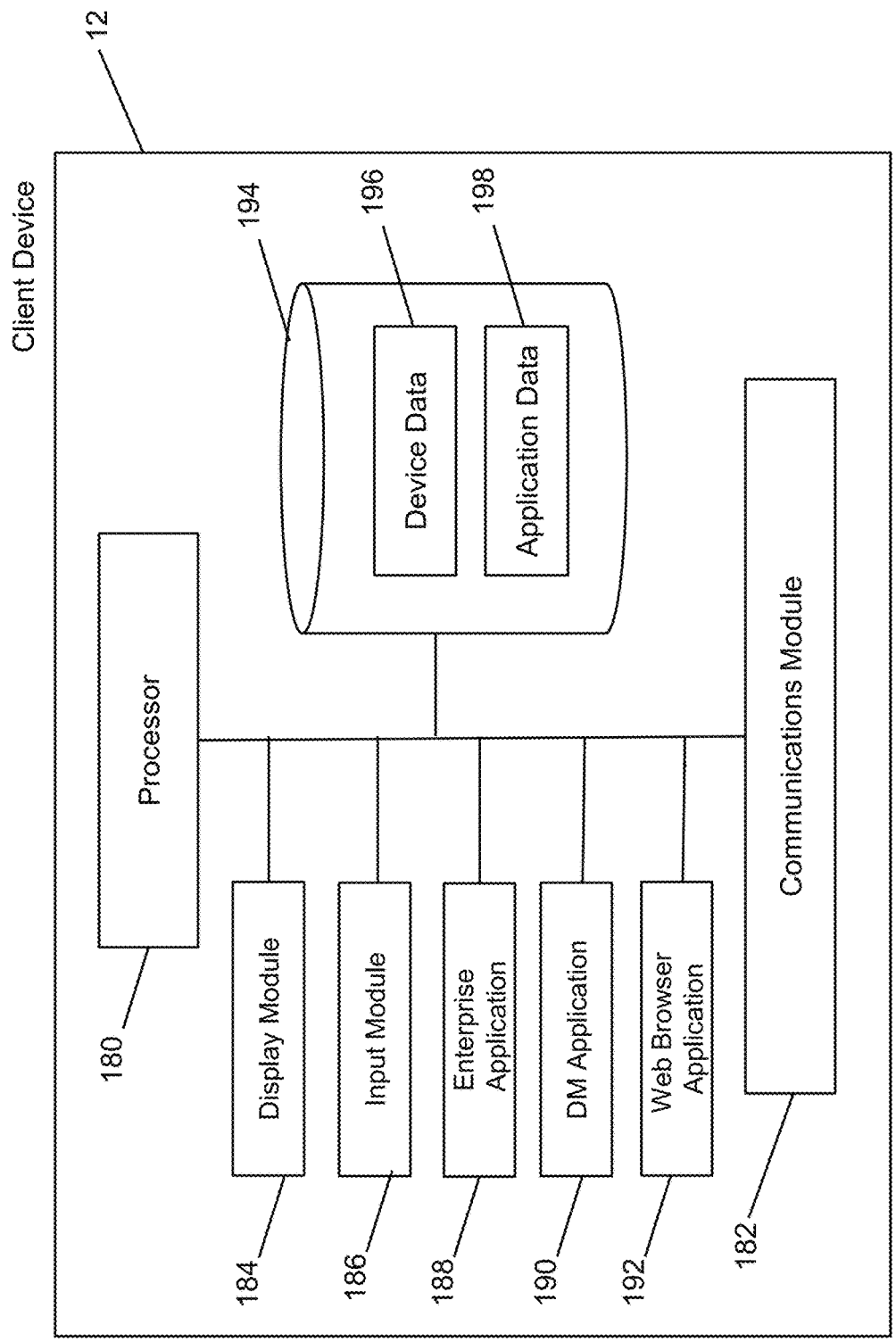
FIG. 9 is a block diagram of an example configuration of a client computing device associated with a user, customer, or client.

In FIG. 9, an example configuration of the client device 12 is shown. In certain embodiments, the client device 12 may include one or more processors 180, a communications module 182, and a data store 194 storing device data 196 and application data 198. Communications module 182 enables the client device 12 to communicate with one or more other components of the computing environment 8, such as DM system 10, cloud platform 18, or enterprise system 16, via a bus or other communication network, such as the communication network 14. While not delineated in FIG. 9, the client device 12 includes at least one memory or memory device that can include a tangible and non-transitory computer-readable medium having stored therein computer programs, sets of instructions, code, or data to be executed by processor 180. FIG. 9 illustrates examples of modules and applications stored in memory on the client device 12 and operated by the processor 180. It can be appreciated that any of the modules and applications shown in FIG. 9 may also be hosted externally and be available to the client device 12, e.g., via the communications module 182.

In the example embodiment shown in FIG. 9, the client device 12 includes a display module 184 for rendering GUIs and other visual outputs on a display device such as a display screen, and an input module 186 for processing user or other inputs received at the client device 12, e.g., via a touchscreen, input button, transceiver, microphone, keyboard, etc. The client device 12 may also include an enterprise application 188 provided by their enterprise system 16, e.g., for performing mobile banking operations. The client device 12 in this example embodiment also includes a web browser application 192 for accessing Internet-based content, e.g., via a mobile or traditional website. The data store 194 may be used to store device data 196, such as, but not limited to, an IP address or a MAC address that uniquely identifies client device 12 within environment 8. The data store 194 may also be used to store application data 198, such as, but not limited to, login credentials, user preferences, cryptographic data (e.g., cryptographic keys), etc.

It will be appreciated that only certain modules, applications, tools and engines are shown in FIGS. 2 to 9 for ease of illustration and various other components would be provided and utilized by the DM system 10, metadata management system 122, cloud platform 18, enterprise system 16, and client device 12, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in DM system 10, metadata management system 122, cloud platform 18, enterprise system 16, and client device 12, or accessible or connectable thereto. Any application or module herein described may be implemented using computer readable/executable instructions that may be stored or otherwise held by such computer readable media.

Figure 10:
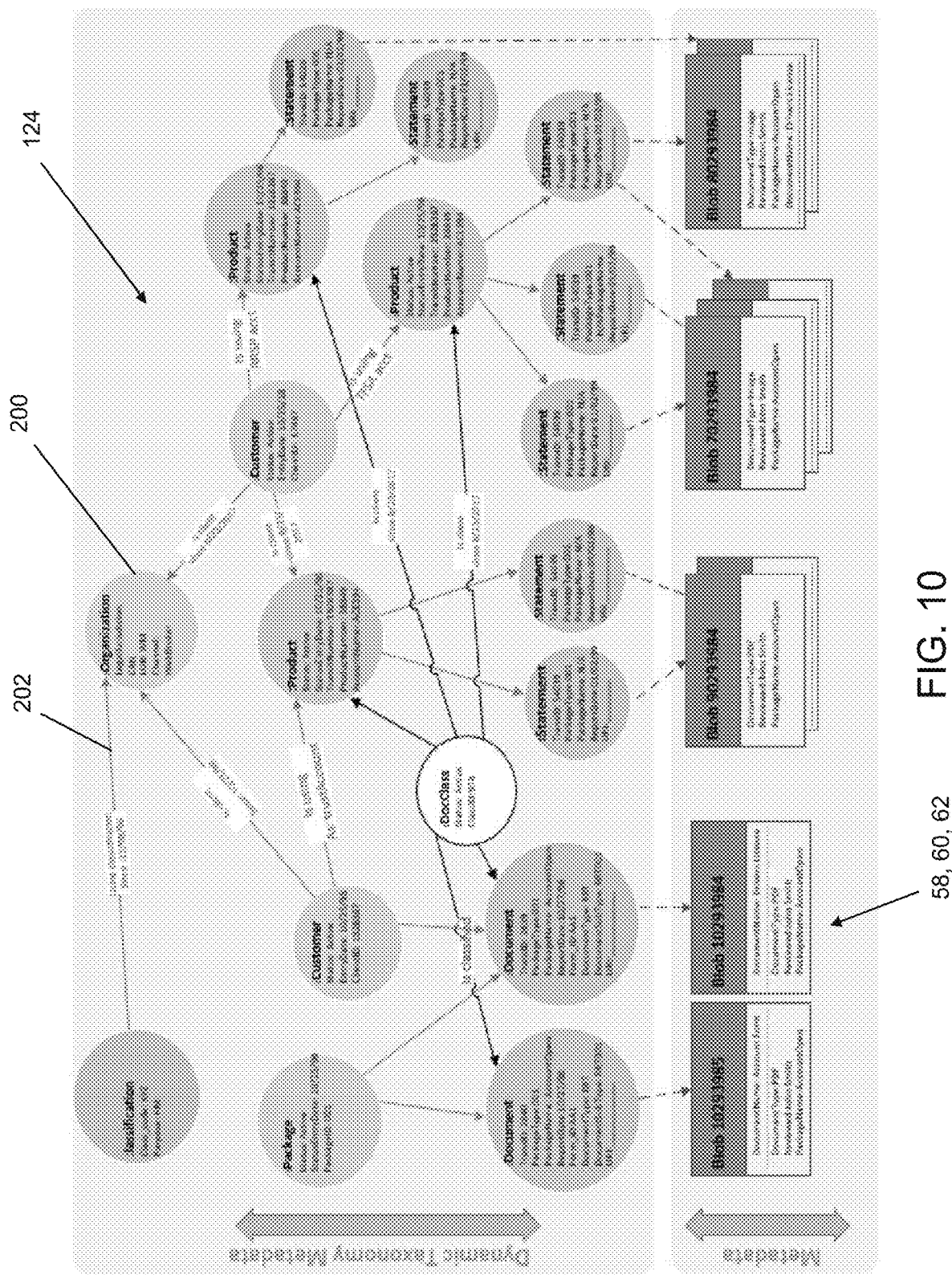
FIG. 10 is a schematic illustration of an example of a metadata graph.

FIG. 10 illustrates an example of a metadata graph 124. In FIG. 10, blobs 58, 60, 62 contain the documents and, in some cases a portion of metadata 22, while the graph 124 (shown above the blobs 58, 60, 62 for illustrative purposes) is used to organize and map the metadata 22. The graph 124 can therefore be used to capture the hierarchical structure of the metadata 22 using nodes 200 (or vertices). Each node 200 can be classified or labeled based on the content it contains. The dynamic relationships between nodes 200 (or vertices) can be captured using edges 202 of the graph 124. The edges 202 themselves can have properties that can change in addition to the content of the nodes 200. Moreover, the edges 202 can have associated ratings based on the importance of that edge 202 or the frequency of use of the edge 202. These ratings can be leveraged to provide the ability to introduce new nodes 200, split existing nodes 200 or introduce nested nodes 200, which is unique to metadata structures used in traditional metadata management. It can be appreciated that by capturing the metadata in the metadata graph 124, e.g., as illustrated in the sample shown in FIG. 10, documents do not need to be retrieved and re-saved when metadata should or is desired to be updated. This increases the performance of the DM system 10 and enterprise system 16 by creating less of a burden for document retrieval, updating, and storage.

Having this capability allows the graph model 126 to change at any time, while the related documents do not need to be accessed. For example, while static data models require that the documents be retrieved, changed, and re-saved (which is a computationally expensive operation), the dynamic model used to create the graph 124 shown in FIG. 10, allows the documents to remain stored with only the metadata graph 124 being updated or expanded. Moreover, the properties themselves can be expanded with the addition of the new nodes 200.

Moreover, activity against the graph 124 and model 126 can be dynamically captured as model or knowledge optimizations. This can be used to monitor usage for security or behavior analyses. A cloud platform search 75 can be used to build cognitive search capabilities against this model 126 and its content.

Figure 11:
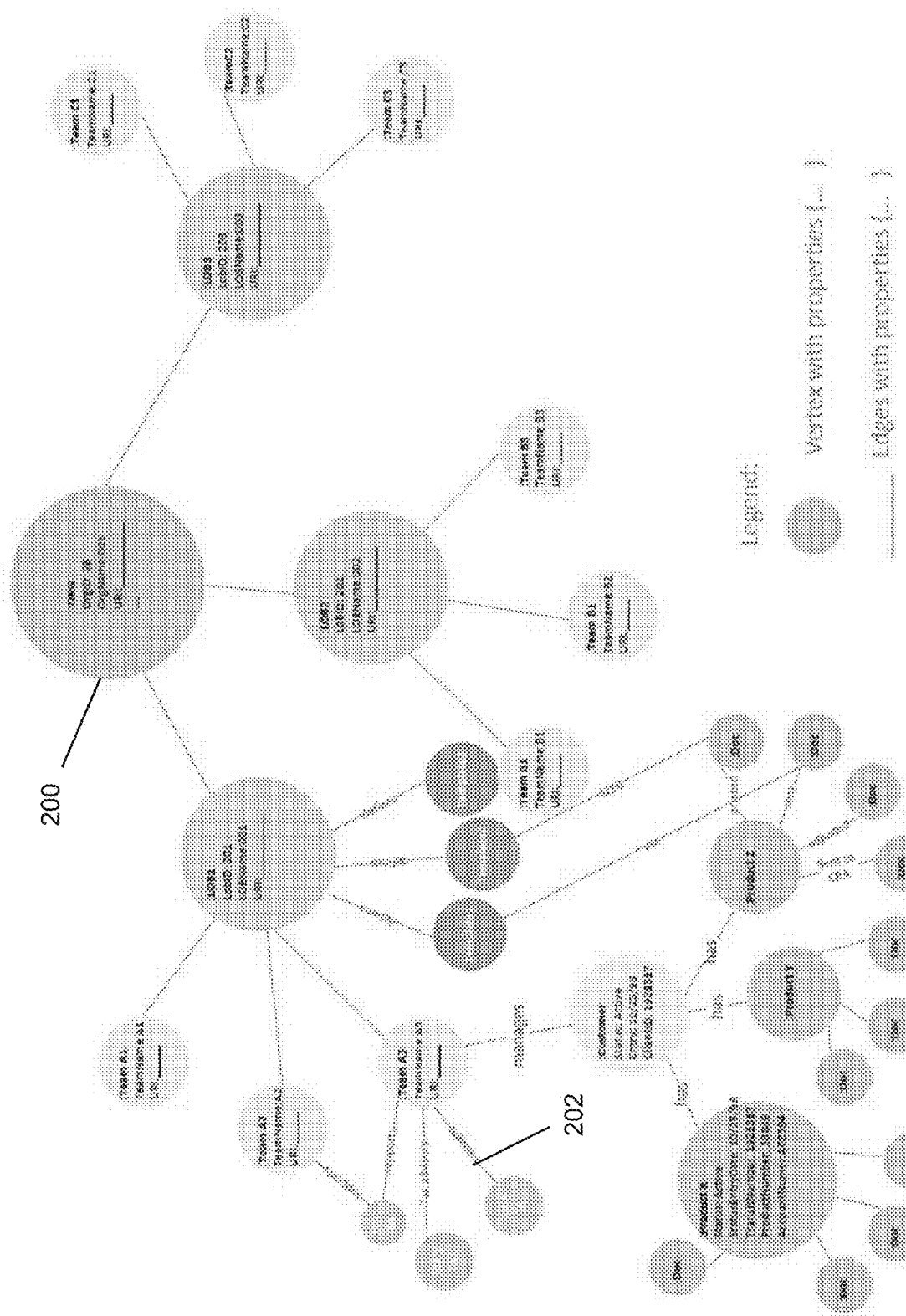
FIG. 11 is a schematic illustration of a metadata graph navigation.

FIG. 11 illustrates an example of a sample graph navigation. It can be seen that edges 202 can include properties such as "has", "manages", "supports", or "defines" to identify the relationships between the nodes 200.

Figure 12:
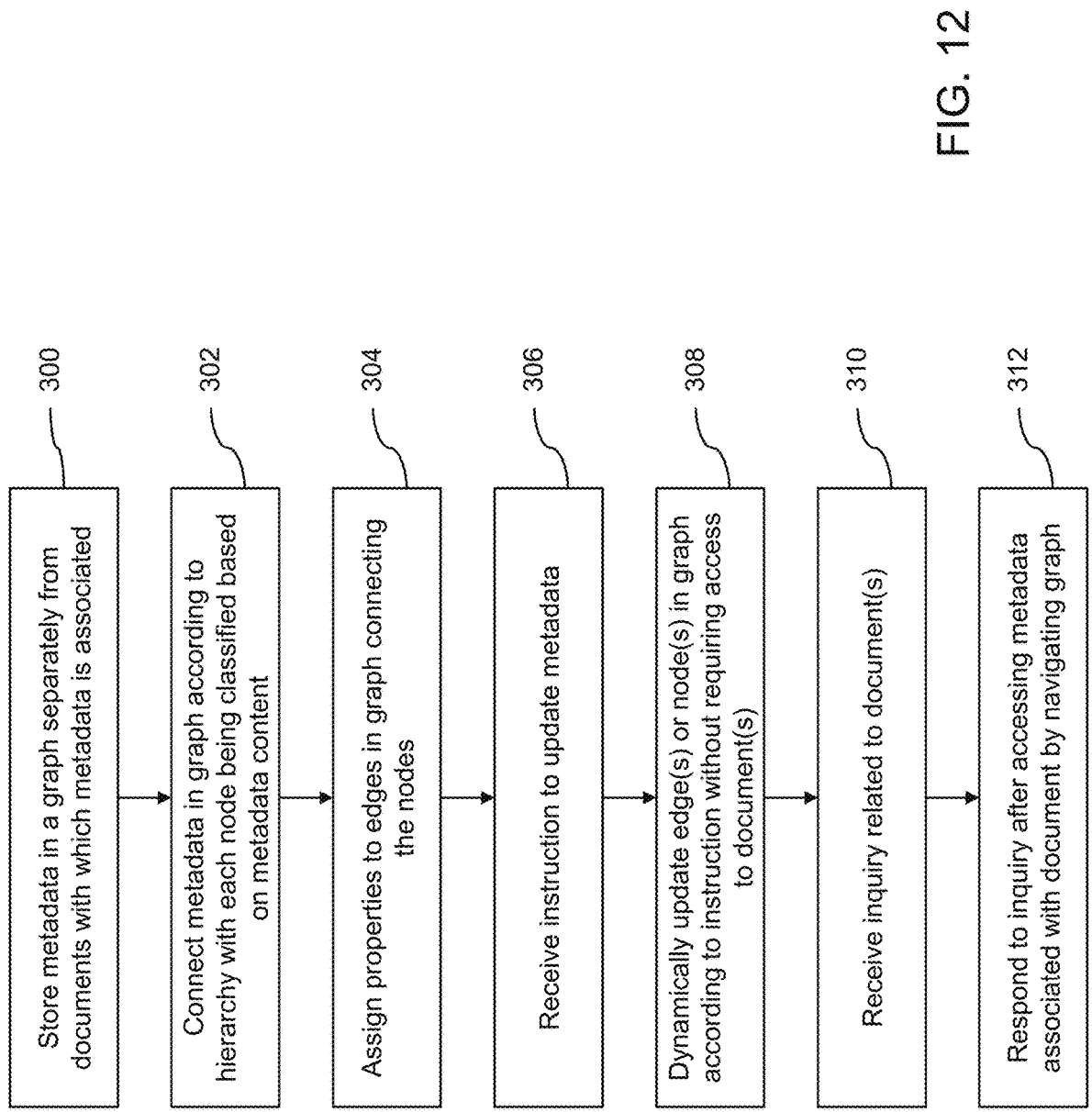
FIG. 12 is a flow diagram of an example of computer executable instructions for document metadata management.

Referring to FIG. 12, an example embodiment of computer executable instructions for managing document metadata. At block 300, the metadata management system 122 stores metadata 22 in a graph 124 separately from the documents with which the metadata 22 is associated, e.g., as shown in FIG. 10. At block 302, the metadata management system 122 connect the metadata 22 in the graph 124 according to a hierarchy, with each node 200 being classified based on metadata content that it holds. At block 304, the metadata management system 122 can assign properties to edges 202 in the graph 124 that connect the nodes 200. In this way, the graph 124 is prepared and stored according to the data model 126 associated with the applications, enterprise, and process workflows of the entities using the documents.

At block 306, the metadata management system 122 receives an instruction to update the metadata 22 and, at block 308, dynamically updates one or more edges 202 and/or one or more nodes 200 in the graph 124 according to the instruction, without the need to access and retrieve the document. At block 310, the metadata management system 122 is also able to receive an inquiry related to a document and, at block 312, respond to the inquiry after accessing the metadata 22 associated with the document, at least in part by navigating the graph 124.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A server device for managing document metadata, the server device comprising:
at least one processor; and
a memory coupled to the at least one processor, the memory storing computer executable instructions that when executed by the processor cause the processor to:
store a plurality of metadata in a graph in a digital document management system with which the metadata is associated;
for each of the plurality of stored metadata, classify metadata into a plurality of classes defined by a taxonomy, wherein the taxonomy classes support a plurality of hierarchical structures within an organization;
connect metadata in the graph into a resulting hierarchical structure based on the metadata classification, and according to the plurality of hierarchical structures, wherein each node of the graph represents a class of the plurality of classes and related metadata content;
assign properties to edges in the graph connecting the nodes; and
enable the stored metadata to be interacted with by permitting access to the stored metadata in the digital document management system.

2. The server device of claim 1, wherein the computer executable instructions further cause the processor to:
receive an instruction to update the metadata; and
dynamically update at least one edge or node in the graph according to the instruction without requiring access to an associated document.

3. The server device of claim 2, wherein the computer executable instructions further cause the processor to:
receive a second instruction to update the taxonomy or the plurality of hierarchical structures; and
dynamically update the resulting hierarchical structure to incorporate the second instruction, without requiring access to associated documentation.

4. The server device of claim 1, wherein the computer executable instructions further cause the processor to:
receive an inquiry related to a document; and
respond to the inquiry after accessing metadata associated with the document by navigating the graph.

5. The server device of claim 4, wherein responding to the inquiry comprises accessing the resulting hierarchical structure of the graph to permit a cognitive search against the resulting hierarchical structure and the contents of the graph.

6. The server device of claim 5, wherein the resulting hierarchical structure is an unstructured data model.

7. The server device of claim 1, wherein the computer executable instructions further cause the processor to:
provide an enterprise application programming interface layer between one or more applications and data storage elements for storing the documents and metadata.

8. The server device of claim 7, wherein the computer executable instructions further cause the processor to:
access both transactional and archive storage containers to accommodate both new containers and legacy storage elements.

9. The server device of claim 8, wherein the enterprise application programming interface layer interfaces with a cloud-based computing service layer to manage access to the transactional and archive storage containers.

10. The server device of claim 7, wherein the enterprise application programming interface accesses a high-volume application interface to process metadata and documents generated by high volume transactional operations.

11. The server device of claim 1, wherein the computer executable instructions further cause the processor to:

determine ratings for the edges of the graph based on an importance or frequency of use of the edge when referencing the graph, and use the ratings to assign metadata to the documents.

12. The server device of claim 11, wherein the ratings for the edges are determined in response to an inquiry, the inquiry being related to a plurality of documents.

13. The server device of claim 1, wherein the computer executable instructions further cause the processor to:
receive a request to add a new metadata feature; and
add one or more edges to the graph to represent the new metadata feature.

14. The server device of claim 1, wherein the computer executable instructions further cause the processor to:
access an associated storage container to access one or more documents; and
process the accessed one or more documents to update the taxonomy based on dynamic relationship constructs that are indicative of the meaning of content within the one or more documents.

15. A method of managing document metadata, the method executed by a server device and comprising:
storing a plurality of metadata in a graph in a digital document management system with which the metadata is associated;
for each of the plurality of stored metadata, classifying metadata into a plurality of classes defined by a taxonomy, wherein the taxonomy classes support a plurality of hierarchical structures within an organization;
connecting metadata in the graph into a resulting hierarchical structure based on the metadata classification, and according to the plurality of hierarchical structures, wherein each node of the graph represents a class of the plurality of classes and related metadata content;
assigning properties to edges in the graph connecting the nodes; and
enabling the stored metadata to be interacted with by permitting access to the stored metadata in the digital document management system.

16. The method of claim 15, further comprising:
receiving an instruction to update the metadata; and
dynamically updating at least one edge or node in the graph according to the instruction without requiring access to an associated document.

17. The method of claim 15, further comprising:
receiving an inquiry related to a document; and
responding to the inquiry after accessing metadata associated with the document by navigating the graph.

18. The method of claim 15, further comprising:
receiving an inquiry related to a document; and
responding to the inquiry after accessing metadata associated with the document by navigating the graph.

19. A non-transitory computer readable medium for managing document metadata, the computer readable medium comprising computer executable instructions for:
storing a plurality of metadata in a graph in a digital document management system with which the metadata is associated;
for each of the plurality of stored metadata, classifying metadata into a plurality of classes defined by a taxonomy, wherein the taxonomy classes support a plurality of hierarchical structures within an organization;
connecting metadata in the graph into a resulting hierarchical structure based on the metadata classification, and according to the plurality of hierarchical structures, wherein each node of the graph represents a class of the plurality of classes and related metadata content;
assigning properties to edges in the graph connecting the nodes; and
enabling the stored metadata to be interacted with by permitting access to the stored metadata in the digital document management system.

20. The method of claim 18, wherein responding to the inquiry comprises accessing the resulting hierarchical structure of the graph to permit a cognitive search against the resulting hierarchical structure and the contents of the graph.

* * * * *